United States Patent [19]

Hondroulis et al.

[11] Patent Number: 6,027,652

[45] Date of Patent: *Feb. 22, 2000

[54] PROCESS FOR SORBING LIQUIDS USING TROPICAL FIBERS

[75] Inventors: Dimitrios George Hondroulis, Metairie, La.; Ian Paul Ratowsky, Harrisburg, Pa.; Neville William Kingham; Katherine Tracy Bergquist-Kingham, both of Dunwoody, Ga.

[73] Assignee: FyBx Environmental, Inc., Atlanta, Ga.

[ * ] Notice: This patent issued on a continued prosecution application filed under 37 CFR 1.53(d), and is subject to the twenty year patent term provisions of 35 U.S.C. 154(a)(2).

[21] Appl. No.: 08/832,753

[22] Filed: Apr. 4, 1997

[51] Int. Cl.[7] ........................................ C02F 1/28
[52] U.S. Cl. ........................ 210/671; 210/691; 210/924
[58] Field of Search ................... 210/671, 680, 210/691, 242.4, 282, 924

[56] References Cited

U.S. PATENT DOCUMENTS

| | | |
|---|---|---|
| 151,662 | 6/1874 | Herron . |
| 264,168 | 9/1882 | Jordan . |
| 450,119 | 4/1891 | Warrand . |
| 450,120 | 4/1891 | Warrand . |
| 456,241 | 7/1891 | Davis . |
| 497,911 | 5/1893 | Davis . |
| 1,181,553 | 5/1916 | Taylor et al. . |
| 1,357,580 | 11/1920 | Moody et al. . |
| 1,362,723 | 12/1920 | Marr . |
| 1,367,279 | 2/1921 | Pomorski . |
| 1,717,798 | 6/1929 | Marr . |
| 1,831,740 | 11/1931 | Elöd . |
| 1,882,657 | 10/1932 | Elöd . |
| 1,981,883 | 11/1934 | Tappan et al. . |
| 2,520,483 | 8/1950 | Vanderjagt ................................. 8/117 |
| 3,617,565 | 11/1971 | Fahlvik ..................................... 210/40 |
| 3,791,990 | 2/1974 | Fletcher ................................... 252/427 |
| 4,072,794 | 2/1978 | Tomita et al. ........................... 210/924 |
| 4,172,039 | 10/1979 | Akiyama .............................. 210/242.4 |

(List continued on next page.)

OTHER PUBLICATIONS

Lab Safety Supply, Inc., Catalog pp. 586–598.
Metro Industrial Sales Co., Exsorbet Brochure.
Sorbent Control Systems, Inc., Sorbee Brochure.
G. N. Ramaswamy et al., Kenaf/Cotton Blends for Textiles, Family and Consumer Sciences Research Journal, 24:2 pp. 180–190. Dec. 1995.
K. Russell, Mississippi hosts Japanese Paper & Pulp Executives on Kenaf Fact–Finding Mission, Mississippi Business Journal, 18:23 Jun. 3, 1996.

(List continued on next page.)

*Primary Examiner*—Ivars Cintins
*Attorney, Agent, or Firm*—Troutman Sanders LLP; Gerald R. Boss

[57] ABSTRACT

A process is described for using tropical fibers to recover spilled oil, gasoline, kerosene, hydrocarbons, pentachlorophenol, creosote or other hazardous liquids from land or water. The sorbent fiber material is produced from agricultural byproducts from cultivation of banana, plantain, cavendish plant, pineapple, coconut, palm, or other tropical fruit bearing plants. The sorbent fibers are produced by separating the raw plant materials; washing the separated fibers in a solution of 1% alum; pressing the fibers to extract liquids and natural juices; further separating the fibers by beating or agitating; and drying the fibers. The sorbent fibers have a water and natural liquid content of less than 10% by weight and may be applied to the surface or periphery of an oil or chemical spill, whereupon they will sorb the oil or chemical. Once the oil or chemical is sorbed the fibers may be collected and the oil or chemical may be partially recovered by compressing the fibers. The fibers may be disposed of by landfilling or may be thermally treated. When thermally treated in a boiler or furnace, the liquid laden fibers may also be a valuable source of fuel.

18 Claims, 5 Drawing Sheets

U.S. PATENT DOCUMENTS

| | | | |
|---|---|---|---|
| 4,343,680 | 8/1982 | Field et al. | 162/100 |
| 4,497,712 | 2/1985 | Cowling | 210/691 |
| 4,547,263 | 10/1985 | Quame | 162/14 |
| 4,604,313 | 8/1986 | McFarland et al. | 428/172 |
| 4,659,478 | 4/1987 | Stapelfield et al. | 210/690 |
| 4,902,544 | 2/1990 | Kim et al. | 428/36.1 |
| 4,925,343 | 5/1990 | Raible et al. | 405/60 |
| 4,969,774 | 11/1990 | Arseneault et al. | 405/60 |
| 5,009,790 | 4/1991 | Bustamante et al. | 210/689 |
| 5,021,390 | 6/1991 | Hatton | 502/401 |
| 5,114,593 | 5/1992 | Diaz | 210/691 |
| 5,186,831 | 2/1993 | DePetris | 210/242.4 |
| 5,227,072 | 7/1993 | Brinkley | 210/671 |
| 5,229,006 | 7/1993 | Brinkley | 210/671 |
| 5,271,691 | 12/1993 | Willet et al. | 405/60 |
| 5,352,780 | 10/1994 | Webb et al. | 536/56 |
| 5,360,654 | 11/1994 | Anderson et al. | 428/98 |
| 5,403,478 | 4/1995 | Brinkley | 210/242 |
| 5,468,536 | 11/1995 | Whitcomb et al. | 428/98 |
| 5,492,881 | 2/1996 | Diamond | 502/401 |

OTHER PUBLICATIONS

Millsaps Sorbent and Environmental Laboratory, Final Report on Sorbency Evaluation for Kenaf, Aug. 31, 1993.

Boyd, C. R., & Ramaswamy, G.N. (1995). Product Development Using a Kenaf Blend Textile. Proceedings of International Kenaf Association, pp. 173–178, Dallas, TX.

Borazjani, A. And Diehl, S. V. 1994. Kenaf Core as an Enhancer of Bioremediation. "A Summary of Kenaf Production and Development Research (1989–993)". MAFES Bulletin #1011. Miss State Univ. May 1994. pp. 26–27.

PROCESS FOR SORBING LIQUIDS USING TROPICAL FIBERS

BACKGROUND OF THE INVENTION

1. Technical Field

This invention relates generally to the use of a sorbent material to sorb liquids. Particularly, this invention relates to the use of processed tropical fibers, such as banana, plantain, cavendish plant, pineapple, coconut, and palm, to recover spilled oil, gasoline, kerosene, solvents, hydrocarbons, pentachlorophenol (PCP), creosote or other liquids.

2. Description of the Prior Art

Spills of oil, solvents and hazardous materials are a continuing problem having serious environmental consequences, including damage to the oceans, beaches, inland rivers, streams and creeks, as well as detrimental effects upon the health of wildlife and humans. The need for oil and chemical products has created consistent growth in the chemical industry, including the transport and manufacturing of these compounds, resulting in increasing environmental problems associated with spills, accidents and improper disposal.

Sorbent materials, including both materials that absorb and materials that adsorb, have been used for many years in the cleanup of oil and hazardous materials by private industry and the federal government. Sorbent clay materials are currently the material of choice for absorbing or recovering oil or other hazardous chemicals on land. In industrial applications, these materials have the disadvantages of low sorbent capacity and a high density which make them both heavy and difficult to transport. Additionally, the abrasiveness and friability of these products may lead to increased wear of nearby industrial machinery. These clay based sorbents are not biodegradable and, therefore, pose an additional environmental problem because they must be disposed of in the limited space available in landfills. Peat, diatomaceous earth and vermiculite are sometimes used as alternatives to the clay based sorbents.

The primary sorbents used in remediation of spills of oil or other hazardous substances on water consist of synthetic materials such as polypropylene, which is currently the product of choice for industry and remediation specialists. However, since polypropylene is itself a synthetic chemical, its production handling can be the source of other environmental problems. Additionally, because these synthetic sorbents are not biodegradable and currently must be disposed of in landfills, they increase the load on the limited available landfill capacity. Therefore, a need exists for an efficient natural sorbent material which is not a source of environmental problems.

One process for alleviating the environmental problems associated with the production of oil or chemical sorbent materials is to use a sorbent system based on natural fibers. Over the last several decades, a wide variety of treated natural fibers have been used as sorbents of hazardous materials. These have included tree bark, peat, wood fiber, dealginate kelp, powdered lily, kenaf cores, puffed cereals, and a variety of other cellulosic materials. Each of these fiber types has disadvantages which have prevented them from becoming the material of choice for remediation of oil and chemical spills on land or in water.

The primary disadvantage of most of these fiber types is that they are naturally hydrophilic and, therefore, tend to sorb large quantities of water. Sorption of water increases the weight of these materials and can seriously decrease their ability to sorb the oil or hazardous chemical which these materials are intended to recover. It is possible to reduce or eliminate the tendency of some of these materials to sorb water by treatment with chemical additives to increase their hydrophobicity.

For example, in U.S. Pat. No. 5,021,390, Hatton teaches a composition for sorbing liquids consisting of various fibrous plant materials treated with the waterproofing agent sodium methyl silicate. In U.S. Pat. No. 5,492,881, Diamond teaches a sorbent system using finely ground cellulose treated with a hydrophobic agent such as paraffin, other waxes, polyvinyl alcohol, hydroxyethyl cellulose or the like. These additives add to the manufacturing expense of the sorbent and may themselves be the source of further harm to the environment.

Another disadvantage of previously disclosed natural fiber based sorbents is that most are generally only capable of sorbing 5–10 times their mass in oil or other chemicals. Additionally, most of these natural fiber compositions have a tendency to sink as they become saturated with oil, water or other chemicals, making recovery of these materials and sorbed chemical from a body of water extremely difficult or impossible.

Several of the previously disclosed fiber compositions are not readily biodegradable which poses a potential environmental problem since these fibers will not easily degrade when disposed of in a landfill. For example, in U.S. Pat. No. 3,791,990, Fischer et al. teach an oil sorbent material composed of peat fibers dried to less than 10% by weight water. These fibers are believed not to be biodegradable, which, although beneficial from the stand point of reducing leaching of the liquids, results in a long lifetime in landfills. Overuse of the limited landfill capacity is a major environmental problem, and it is therefore desirable to provide a sorbent material which is readily biodegradable after use and recovery of the oil, solvent or other liquids.

Presently, banana stalks, plantain stalks, cavendish plant stalks, pineapple crowns, palm, palmetto and coconut fronds, and a variety of other tropical plant portions are thought of as waste agricultural byproducts in the countries in which they are produced. Currently these byproducts are disposed of in landfills, where they can attract insects and contribute to landfill capacity problems. Additionally, they may be discarded into rivers, where they oxidize and can cause potential environmental problems. In other instances, the byproducts are left on the ground to act as a natural fertilizer.

SUMMARY OF THE INVENTION

The present invention recognizes and addresses the above-discussed shortcomings and disadvantages, as well as others, of prior sorbent materials. In accordance with the teachings of the present invention, a novel process for using processed tropical fibers in the remediation of spills of oil or other liquids is disclosed.

More specifically, the present invention comprises a process for sorption of spilled oil, kerosene, gasoline, solvents, hydrocarbons, PCP, creosote or other liquids. This process includes the general steps of conversion of the raw tropical plant materials to useful sorbent fibers; application of the sorbent fibers to a body of spilled liquid; collection or recovery of the fibers; and disposal of the fibers either by thermal treatment or landfilling. Additionally, a step may be included wherein the oil, solvent or other hazardous material is extracted from the fibers before disposal.

The sorbent fibers are produced from tropical fibers, such as banana, plantain or cavendish plant stalks, pineapple crowns, coconut palm or palmetto fronds, or the pinzote (fruit bearing body) of palm. In general, these plant materials have a high content of water and natural latex, of which a substantial portion must be removed to produce useful sorbent fibers. In order to convert them into sorbent fibers, the raw plant materials are cut, ground, shredded or otherwise separated into a mass of separated fibers; the fibers are washed; the fibers are pressed to extract natural liquids; the fibers are further separated by beating or agitating; and the fibers are dried. This process may be fully or partially automated.

In a preferred embodiment, the processed tropical fibers are processed to have a final water and natural liquid content of less than 10% by weight. Approximately 50% of the naturally occurring latex is also removed by this processing. Once dried to this point the processed fibers become substantially hydrophobic, without requiring the addition of additives.

The processed tropical fibers may be applied to the liquid on water or land in a variety of forms, including as loose fibers or packaged in booms, pillows, socks, dikes, mats, pads and the like. When the material is applied to a waterborne spill it will sorb the oil, solvent or hazardous chemical. The hydrophobic nature of the fibers will cause them to aggregate, facilitating their recovery. If the fibers have been applied in packaged form, then it is a simple matter to recover the packages.

After recovery of the fibers, the oil or other liquid may be recovered from the fibers by compressing the collected fiber mass. The fibers may then be simply disposed of in a landfill since they are biodegradable and help reduce leaching of the sorbed liquids. Alternately, the fibers can be easily disposed of by thermal treatment and, in fact, may serve as a valuable source of fuel since they have a high BTU content and produce a low amount of ash residue.

The loose sorbent fibers are also useful in the stabilization or solidification of chemical contaminants in contaminated soils, sludges or other semi-solids. In this application, the fibers are mixed directly into the soil or may be mixed with cement-based stabilization agents to reduce the leachability of contaminants from solidified soil.

The present invention provides several advantages over the prior art processes of sorbing oil or other hazardous chemicals. Of primary importance, the tropical fiber sorbent material is biodegradable and not harmful to the environment either in its production, use or disposal. Furthermore, use of this material provides a use for tropical agricultural byproducts which would otherwise be disposed of as waste material in potentially environmentally harmful ways. The tropical fiber material is also relatively inexpensive since it may be produced from plentiful agricultural byproducts which are currently largely unused. The tropical fiber material is neither abrasive nor friable, and therefore is not a source of wear for industrial machinery. The tropical fiber sorbent material will also sorb up to 15 times its own weight in petroleum products, does not significantly sorb water, will float indefinitely and will aggregate on open water making recovery both simple and inexpensive.

The aforementioned and other aspects of the present invention are described in the detailed description and attached illustrations which follow.

DETAILED DESCRIPTION OF PREFERRED EMBODIMENT

Figure 1:
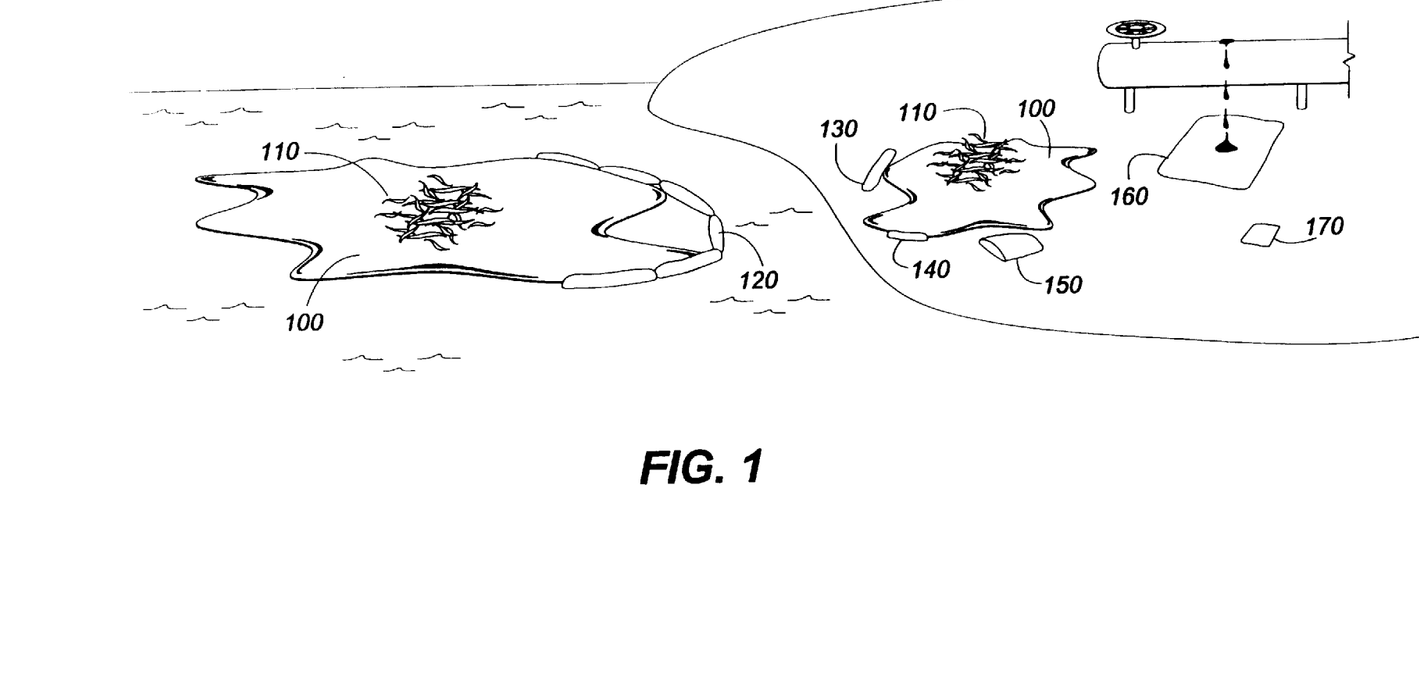
FIG. 1 is a diagram illustrating several processes whereby the tropical fiber sorbent product may be applied to a body of liquid.

Referring now to the figures in which like reference numerals indicate like or corresponding features, FIG. 1 shows several processes whereby the tropical fiber sorbent product may be applied to a body of liquid 100, including as loose fiber 110, booms 120, socks 130, dikes 140, pillows 150, mats 160 or pads 170.

The critical element in the present process is the use of dewatered, partially delatexed sorbent fibers from tropical plants. These sorbent fibers 110 may be from any of a variety of tropical agricultural by-products including, but not limited to, banana stalks, plantain stalks, cavendish plant stalks, pineapple crowns, palm fronds and pinzote, palmetto fronds and coconut fronds. The raw tropical plant materials fibers may be processed in any of a variety of ways to convert them into sorbent fibers, including, but not limited to the subsequently described processes.

In the preferred embodiment, the sorbent fibers 110 are produced from banana, plantain or cavendish plant stalks, pineapple crowns or other similar high liquid content plant materials. These materials are byproducts of the cultivation of these crops, and are produced in large quantities on a yearly basis since these plants generally produce fruit only one time before they are harvested and cut back. The stalks or crowns may be transported to the processing site after harvesting. In general, these plant materials have a water and natural latex content of approximately 80% by weight.

Figure 2:
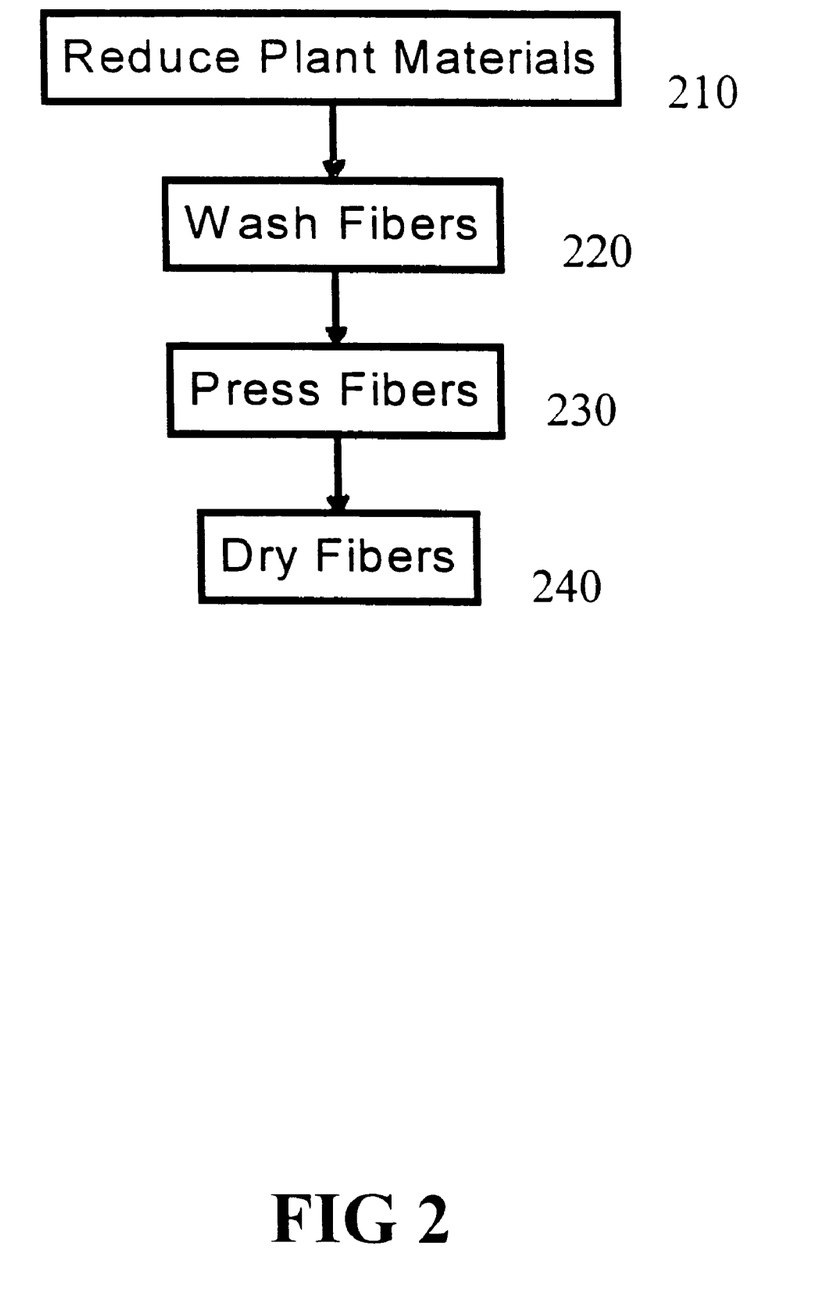
FIG. 2 is a diagram illustrating the steps used in processing the raw tropical plant materials into useful sorbent fibers.
Figure 5:
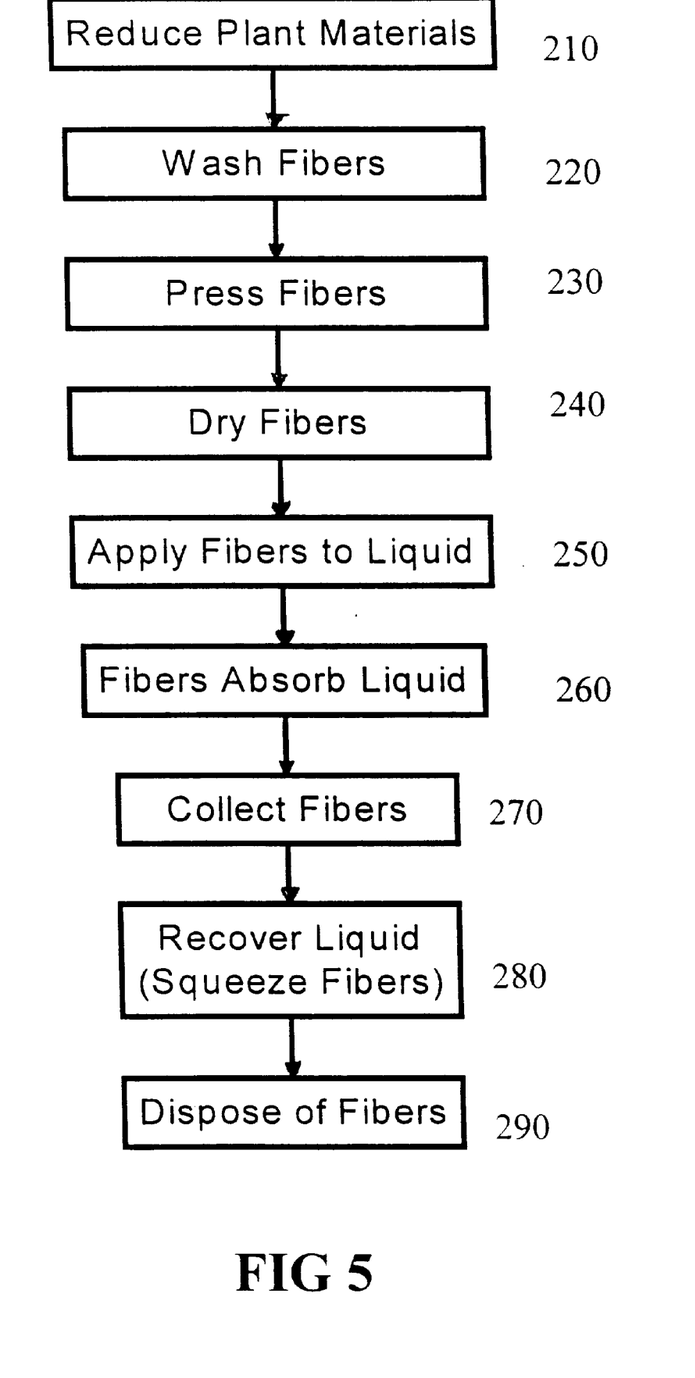
FIG. 5 is a diagram illustrating both the steps used to produce the fibers and the steps for remediation and recovery of a spilled liquid.

Referring to FIG. 2 and FIGS, once at the processing site, the raw plant materials are subjected to an initial reducing step 210 wherein they are cut, ground, shredded or otherwise converted into a mass of separated fibers; the fibers are subjected to a washing step 220 wherein they are washed in a solution of 1% alum; the fibers are subjected to a pressing step 230 wherein they are pressed to extract liquids and natural juices; and the fibers are then subjected to a drying step 240. This procedure may be automated.

In the preferred embodiment the raw plant materials are first reduced 210 in a roller with blades that draws the stalks or crowns into a series of rotating ¼" steel knives or blades. These blades cut the stalks into fibers ranging from ¼" to 1" in length and serve to separate the fibers. The separated fibers are then propelled through the neck of the grinder into the awaiting washer.

The fibers are washed 220 in a solution of 1% alum in water for a period ranging from 15 min. to 45 min. During this wash step 220 the fibers are constantly subjected to the action of bladed paddles which act to agitate the fibers and further separate them. The fibers are then pumped out of the washer by a common sewer pump which also serves to further separate the fibers. The fibers are then deposited onto a steel mesh screen to separate the water from the fibers. Excess water can then be recycled back into the washing system.

This washing step 220 is of critical importance in the fiber preparation process. Washing the raw plant material in a mild alum (aluminum sulfate) solution results in the extraction of a substantial portion of the latex and other resinous natural juices found in the stalk. Removal of a portion of the latex and other plant natural juices is necessary to obtain useable fibers which are not initially aggregated into a relatively non-sorbent mass upon drying, however, it is also necessary that a portion of these materials be retained to contribute to the hydrophobicity of the fiber product. It is likewise important that the wash step not be carried out by boiling at high temperature, since this can lead to degradation of the fibers.

After washing, the fibers are subjected to a pressing step 230 for removal of a significant portion of the remaining water, latex and other natural juices. The press exerts a high tonnage, and may consist of a hydraulic press, a screw press or a belt press. The resulting compressed fiber mass has a water and natural liquid content or approximately 25–30% by weight. It is important to note that this relatively low liquid content is easily achieved by performing the pressing step 230 after the initial separating 210 and washing 220 steps and drying step 240. This results in a reduction in the time and energy required to dry the fibers and a substantial improvement of the workability of the fibers during the following steps.

After pressing 230, the fibers are subjected to a drying step 240 in which industrial strength dryer circulates hot air from an incinerator through the fibers to dry them to a liquid content of approximately 1–15%. Once dry, the fibers may optionally be subjected to further reducing steps to pulverize the fibers to $\frac{1}{8}$" to $\frac{1}{4}$ in length. The fibers may then be baled by a conventional hay baler or bagged for transport and storage.

One skilled in the art will recognize that many variations of this embodiment are practical including conversion of this system to a continuous flow system wherein raw plant material is constantly being reduced to fibers and washed followed by pressing in a screw press or other means to constantly squeeze out moisture, and by further continuous flow separating steps similar to those previously described.

In an alternate embodiment, fibers may be prepared from fronds and stems or pinzote from palm, palmetto, and coconut, which are again common agricultural byproducts in certain tropical countries. These plant materials may be converted into sorbent fibers by cutting, grinding or otherwise reducing the raw plant material into a fibrous mass, separating out the fibers from the non-fibrous materials, and packaging the fibers.

Figure 3:
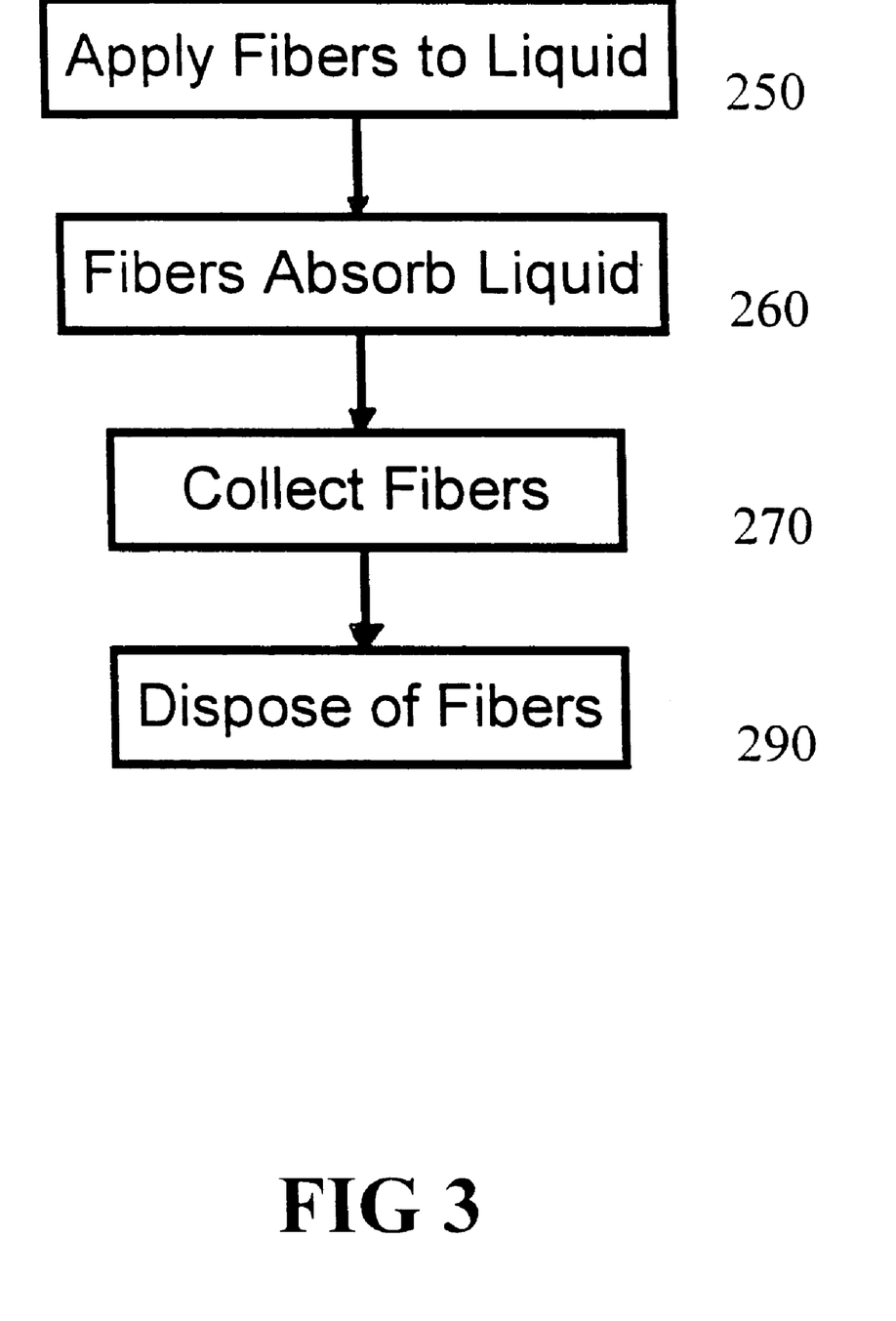
FIG. 3 is a diagram illustrating the steps for remediation of a spilled liquid.
Figure 4:
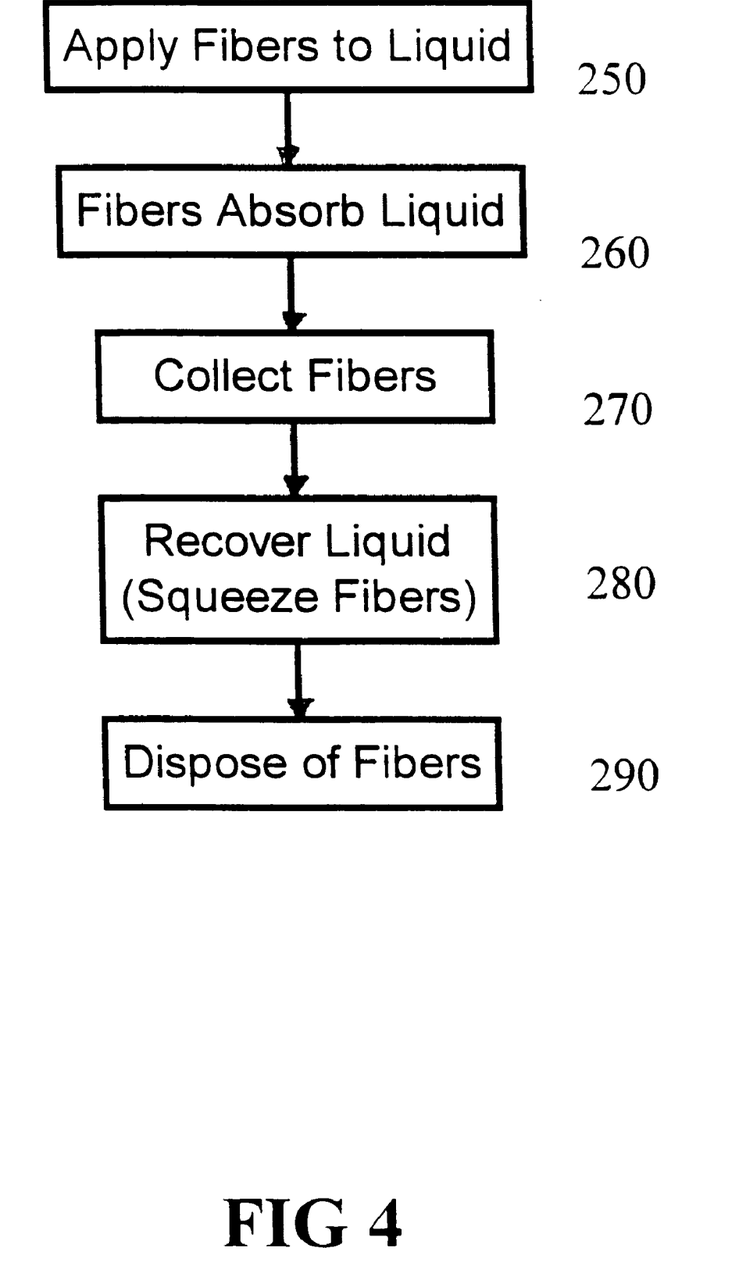
FIG. 4 is a diagram illustrating the steps used in remediation and recovery of a spilled liquid.

Referring now to FIG. 3, FIG. 4 and FIG. 5, the sorbent tropical fiber material may be applied 250 directly to the surface of an oil spill on land or water by dropping the loose sorbent fibers 110 over the body of liquid 100. Alternatively, the loose fibers 110 may be applied 250 by being blown out over the spill by a blower such as those used to blow fibrous insulation into a wall or ceiling. If the loose fibers 110 are used on land, they may be swept up and collected 270 once they have sorbed the spilled liquid.

Since the loose fibers 110 are naturally hydrophobic they will sorb hydrophobic liquids and additionally will tend to aggregate if dispersed over the surface of a body of water. Once aggregated, the loose fibers 110 will float indefinitely and may be easily collected 270 from the body of water.

The tropical fiber material may be packaged into a wide variety of forms including booms 120, socks 130, dikes 140, pillows 150 and the like. Generally this is accomplished by filling a porous package with a quantity of the loose tropical fiber material 110. The packaging material may be made of polypropylene, nylon, cotton or other similar materials, and ideally should be permeable to oil while excluding water. Booms 120, as commonly recognized in the art, are large sausage-shaped containers which are stitched on one side to contain the fiber material and may be attached end to end to contain a waterborne spill of oil or other hazardous liquid. Booms 120 usually range in size from a 4" to 8" diameter and form 3' to 6' in length. Socks 130 and dikes 140 are smaller than booms, but similar in structure. Pillows 150 are sealed pouches containing the loose fiber and can be any shape.

Typically, the booms 120 will be used on open water by joining together the booms to form a ring encircling the spilled liquid 100. Alternatively, the booms 120 may be strung together just offshore to sorb as much of the oil or other hazardous liquid 100 as possible before it can be deposited on the beach or shoreline where it is likely to cause the most significant environmental damage. The socks 130, dikes 140 and pillows 150 may be used in a similar fashion, or may be placed directly on the site of a smaller body of liquid 100 to sorb the liquid.

Alternatively, mats 160 and pads 170 made of compressed fiber with no outer covering may be used. In a preferred embodiment, these mats 160 have a thickness of ¼–½ inch and may range in size from 2'×2' to 4'×4'. These mats 160 or pads 170 may be used to sorb spilled oil, solvents or other hazardous chemicals on land by simply bringing the packaged fibers into contact with the spill and allowing sorption to occur. The fiber mats 160 and pads 170 are particularly useful for sorbing spills of oil and other automotive liquids from a garage floor or driveway, and may be placed under a work area in anticipation of spills occurring during automotive or industrial repairs. When the packaged fibers, mats 160 or pads 170 are saturated with liquid, or the user decides enough of the liquid has been sorbed the packages, mats or pads may be collected and, if necessary, replaced with new packages, mats or pads.

The fibers 110 may also be applied to a contaminated liquid as a filtration medium through which the contaminated liquid is passed. When used as a filter, the fibers may be included in-line in a forced flow fluid system, wherein the contaminated liquid is pumped through the filtration material to more quickly treat high liquid volumes.

It is possible to include a recovery step 280 wherein a significant portion of a spilled liquid may be recovered after sorption by the tropical fiber material by pressing the fibers to squeeze out the liquid. The fibers may then be either disposed 290 of or reused at the owners discretion. Alternatively, if the liquid is combustible, the disposal step 290 may include thermally treating (e.g. incinerating) the fibers. Fibers saturated with combustible liquid may also serve as a valuable fuel source if thermally treated by burning in an appropriate furnace or boiler. For less hazardous liquids such as vegetable oil or animal waste the disposal step 290 may include disposal of the fibers in a landfill.

The loose sorbent fibers 110 are also useful in the stabilization or solidification of chemical contaminants in contaminated soil, sludge, sand, clay, gravel, dust or other semi-solids. In this application, the loose fibers 110 are mixed directly with the into the semi-solid or may be mixed with cement-based stabilization agents to reduce the leachability of contaminants from solidified soil. It is not necessary to recover the loose fibers 110 in this application as they may serve to reduce leachability of the chemicals until either the fibers or chemicals degrade over time.

When mixed with a semisolid, the loose sorbent fibers 110 also provide a source of organic material to encourage the growth of bacteria and other microscopic organisms, thereby enhancing the biodegradation of the contaminating liquid. Additionally, since bacteria and other microscopic organisms are initially present in the fibers 110, the fibers 110 may serve as a source of organisms to enhance bioremediation of the contaminated liquid.

What has been described above are preferred embodiments of the present invention. It is, of course, not possible to describe every conceivable combination of methodologies for purposes of describing the present invention. However, one of ordinary skill in the art will recognize that any further combinations, permutations and modifications of the present invention are possible. Therefore, all such possible combinations, permutations and modifications are to be included within the scope of the claimed invention, as defined by the claims below.

What is claimed is:

1. A process for sorbing a hydrophobic liquid comprising the steps of:

providing a plurality of washed fibers originating from a tropical plant material having naturally hydrophobic fibers, wherein said washed fibers have been washed in a 1% alum solution to extract a portion of naturally occurring water and latex to improve the hydrophobic absorptivity of said fibers;

applying said plurality of washed fibers to a body containing the hydrophobic liquid; and sorbing the hydrophobic liquid from the body with said plurality of washed fibers.

2. The process of claim 1, wherein said plurality of washed fibers has a water and natural liquid content not greater than 30% by weight.

3. The process of claim 1, wherein said plurality of washed fibers has a water content not greater than 10% by weight.

4. The process of claim 1, wherein said plurality of washed fibers originate from a tropical plant material selected from the group consisting of: banana stalks, plantain stalks, cavendish plant stalks, pineapple crowns, coconut fronds, palmetto fronds and palm fronds.

5. The process of claim 1, wherein said applying step includes the step of applying said plurality of washed fibers to a body of water containing said hydrophobic liquid.

6. The process of claim 1, wherein said applying step includes the step of applying said plurality of washed fibers to a semi-solid body contaminated with said hydrophobic liquid.

7. The process of claim 6, further comprising the step of allowing said plurality of washed fibers to biodegrade while in contact with the semi-solid body, thereby enhancing biodegradation of said hydrophobic liquid and decreasing the time required for said hydrophobic liquid to degrade.

8. The process of claim 1, wherein said applying step includes the step of applying said washed fibers as a filtration medium through which the body containing the hydrophobic liquid is passed.

9. The process of claim 1, further comprising the step of collecting the plurality of washed fibers following sorption of the hydrophobic liquid.

10. The process of claim 9, further comprising the step of disposing of the plurality of washed fibers.

11. The process of claim 1, further comprising the step of recovering the hydrophobic liquid from the plurality of washed fibers.

12. The process of claim 11, wherein said liquid recovering step includes the step of compressing said plurality of washed fibers.

13. A process for sorbing a liquid using a plurality of fibers originating from a naturally hydrophobic tropical plant material, wherein said tropical plant material also has a high content of natural juices, said process comprising the steps of:

reducing the naturally hydrophobic tropical plant material to a plurality of separated natural fibers;

washing the plurality of separated natural fibers in a 1% alum solution to remove a portion of naturally occurring water and latex from said plurality of separated natural fibers to improve the hydrophobic absorptivity of said fibers;

drying said plurality of washed natural fibers;

applying said plurality of dried, washed natural fibers to a body containing the hydrophobic liquid; and sorbing the hydrophobic liquid from the body with said plurality of dried, washed natural fibers.

14. The process of claim 13, further comprising the step of packaging said plurality of dried, washed natural fibers.

15. The process of claim 13, further comprising the step of compressing said plurality of dried, washed natural fibers into a solid mass subsequent to said drying step.

16. The process of claim 13, further comprising the step of collecting said plurality of dried, washed natural fibers subsequent to said sorbing step.

17. The process of claim 13, further comprising the step of recovering the hydrophobic liquid subsequent to said sorbing step, wherein said recovering step includes the step of compressing said plurality of dried, washed natural fibers.

18. The process of claim 13, further comprising the step of disposing of said plurality of dried, washed natural fibers by thermal treatment subsequent to said sorbing step.

* * * * *

UNITED STATES PATENT AND TRADEMARK OFFICE
CERTIFICATE OF CORRECTION

PATENT NO. : 6,027,652
DATED : February 22, 2000
INVENTOR(S) : Hondroulis, et al.

It is certified that error appears in the above-identified patent and that said Letters Patent is hereby corrected as shown below:

Title page item [75], remove "Ian Paul Ratowsky, Harrisburg, Pa" from the Inventors Section Signed and Sealed this Ninth Day of January, 2001

Attest:

Q. TODD DICKINSON

*Attesting Officer*        *Commissioner of Patents and Trademarks*